United States Patent
Furuuchi et al.

(10) Patent No.: US 7,679,330 B2
(45) Date of Patent: Mar. 16, 2010

(54) PROTECTION CIRCUIT

(75) Inventors: Yuji Furuuchi, Tochigi (JP); Kazutaka Furuta, Tochigi (JP); Masami Kawazu, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 76 days.

(21) Appl. No.: 10/598,924

(22) PCT Filed: Sep. 6, 2005

(86) PCT No.: PCT/JP2005/016281

§ 371 (c)(1),
(2), (4) Date: Sep. 14, 2006

(87) PCT Pub. No.: WO2006/038412

PCT Pub. Date: Apr. 13, 2006

(65) Prior Publication Data

US 2007/0159138 A1 Jul. 12, 2007

(30) Foreign Application Priority Data

Oct. 4, 2004 (JP) .............................. P2004-291756

(51) Int. Cl.
*H02J 7/00* (2006.01)

(52) U.S. Cl. .................................................. 320/134

(58) Field of Classification Search ................. 320/134, 320/136; 361/91.1, 91.2, 91.5, 93.1, 93.7, 361/93.8, 104
See application file for complete search history.

(56) References Cited

U.S. PATENT DOCUMENTS

| | | | |
|---|---|---|---|
| 6,172,482 B1 * | 1/2001 | Eguchi | 320/134 |
| 6,344,633 B1 | 2/2002 | Furuuchi | |
| 6,791,809 B2 | 9/2004 | Pannwitz | |
| 7,333,315 B2 * | 2/2008 | Kawazu et al. | 361/104 |

FOREIGN PATENT DOCUMENTS

| | | | | |
|---|---|---|---|---|
| JP | 07-153367 | | 6/1995 | |
| JP | 09-261883 | | 3/1997 | |
| JP | 2000-285778 | | 10/2000 | |
| JP | 2002-315202 | | 10/2002 | |
| JP | 2003111268 | A * | 4/2003 | |
| JP | 2004-007942 | | 1/2004 | |

OTHER PUBLICATIONS

Machine Translation for JP 2003111268 A.*

* cited by examiner

*Primary Examiner*—Edward Tso
*Assistant Examiner*—Ramy Ramadan
(74) *Attorney, Agent, or Firm*—K&L Gates LLP

(57) ABSTRACT

A protection circuit is provided, which protects a battery pack from overcurrents and overvoltages using sensing means and a protection device having a heating resistor and a fuse element provided on a circuit board. This protection circuit allows for sharing a protection device regardless of the current rating and the voltage rating of the battery pack, thereby being manufactured at low costs.

7 Claims, 4 Drawing Sheets

PROTECTION CIRCUIT

CROSS REFERENCE TO RELATED APPLICATIONS

The present application claims priority to Japanese Patent Document No. 2004-291756 filed on Oct. 4, 2004, the disclosure of which is herein incorporated by reference.

BACKGROUND

The present disclosure relates to a protection circuit which protects a battery pack from overcurrents and overvoltages using a protection device having heating resistors and fuse elements provided on a circuit board.

As mobile electronic devices such as cellular telephones or notebook PCs have been widely used, the lithium-ion battery market has expanded. These mobile electronic devices typically employ a battery pack having a power supply including one to four lithium-ion batteries connected in series. Such a battery pack may ignite or cause smoke when the lithium-ion battery is overcharged (i.e., becomes under an overvoltage) during recharging, and is thus provided with a protection circuit to avoid overcharges.

This protection circuit is required to protect the batteries from both overcurrents and overvoltages. To this end, a protection circuit is employed which includes a protection device having heating resistors and fuse elements provided on a circuit board, and a sensing device for detecting an overvoltage and switching a current flowing into the protection device. This protection circuit is designed such that the fuse element is melted in an overcurrent condition, while in an overvoltage condition, the sensing device allows a current to suddenly flow through the heating resistor, thereby causing the heating resistor to generate heat by which the fuse element is melted. See, Publication of Japanese Patent No. 2790433.

In recent years, as the market for mobile electronic devices that operate on a large current has been expanded, such a battery pack has come into use that operates at a rated voltage for about 10 serially connected lithium-ion batteries, which is well over previous rated voltages for four or less serially connected lithium-ion batteries.

On the other hand, in the aforementioned battery pack protection circuit, the voltage applied across the heating resistor of the protection device is dependent on the number of serially connected batteries that are included in the battery pack. Accordingly, to ensure that the fuse element of the protection device is melted in an overcharge condition, a lineup of protection devices has to be prepared each of which is provided with a heating resistor having an appropriate resistance value for each number of serially connected batteries. However, now that battery packs have a variety of voltage ratings for four or less to about ten serially connected lithium-ion batteries, this has become problematic due to an increase in costs or price resulting from many different protection devices being produced.

For example, in the protection circuit 1X of FIG. 6 and a protection circuit 1Y of FIG. 7, if protection devices 2A and 2B each include heating resistors 3 and fuse elements 4 are provided on a circuit board, its operable power is 10 to 20 W. One battery 6 within a battery pack 5 has a maximum voltage of 4V, and a voltage sensing IC 8 and an FET 9 are provided as sensing means 7. In this case, the protection devices 2A and 2B have to be prepared such that the heating resistor 3 has the resistance values of Table 1 for each number of serially connected batteries 6 that are included in the battery pack 5.

TABLE 1

| Number of serially connected batteries | Resistance value ($\Omega$) |
| --- | --- |
| 1 | 0.8-1.6 |
| 2 | 3.2-6.4 |
| 3 | 7.2-14 |
| 4 | 13-26 |
| 5 | 20-40 |
| ... | ... |
| 10 | 80-160 |

Suppose that in a battery pack 5 having ten serially connected batteries, the protection circuit 1X of FIG. 6 is formed using a 25$\Omega$ heating resistor corresponding to a battery pack 5 having four serially connected batteries. In this case, in an overcharge condition, the voltage sensing IC 8 detects an overvoltage across the battery pack 5 resulting in a change in the gate potential of the FET 9. The power consumption W at the heating resistor 3 when a large current flows through the heating resistor 3 is given by the following equation:

$$W = V \times V/R = 40 \times 40/25 = 64 \text{ W}$$

This thus amounts to 64 W, which is well beyond the operable range of from 10 to 20 W. For this reason, before the fuse element 4 is melted, the heating resistor 3 will burn.

As can be seen from the foregoing example, it is necessary to use a heating resistor 3 of the protection devices 2A and 2B that has a resistance value corresponding to the voltage on the battery pack 5.

On the other hand, a battery pack used in a mobile electronic device operating on a large current requires the protection device to include a large-current fuse element. From this point of view, a lineup of protection devices with fuse elements of various ratings is required, which has become problematic due to an increase in costs or prices of the protection device.

SUMMARY

According to an embodiment, a protection circuit is provided which protects a battery pack from overcurrents and overvoltages using sensing means and a protection device having heating resistors and fuse elements provided on a circuit board. This protection circuit shares a protection device regardless of the current rating of the battery pack or regardless of the number of serially connected batteries in the battery pack.

According to an embodiment, a protection circuit is provided which protects a battery pack having a plurality of rechargeable batteries connected in series from overcurrents and overvoltages by allowing a voltage to be applied to heating resistors of the protection device within an operable range of the protection device when the protection circuit is activated due to an overvoltage. That is, it is effective to allow the voltage of, not the total number of serially connected batteries in the battery pack, but a predetermined number of batteries to be applied to the heating resistor in an overvoltage condition. Moreover, in detecting an overvoltage using the sensing means, the voltage to be detected need not always be the voltage of the total number of serially connected batteries in the battery pack but may be the voltage of a predetermined number of serially connected batteries. In an embodiment, to allow the shared use of a protection device, which has a rating for normal applications, in large-current applications, the protection devices should be arranged in parallel in a plurality of stages.

That is, a first aspect is to provide a protection circuit for protecting a battery pack having rechargeable batteries connected in series from overcurrents and overvoltages. The protection circuit comprises: a protection device having a heating resistor and a fuse element provided on a circuit board; and sensing means for detecting an overvoltage across any of the batteries in the battery pack and switching a current flowing into the heating resistor. The protection circuit is designed such that the fuse element is melted in an overcurrent condition, and in an overvoltage condition on any of the batteries, the sensing means switches on current flowing into the heating resistor, thereby causing the heating resistor to generate heat and the fuse element to be melted. In particular, the protection circuit may be provided with a plurality of sensing means for detecting an overvoltage between different batteries.

Furthermore, a second aspect is to provide a protection circuit for protecting a battery pack having rechargeable batteries connected in series from overcurrents and overvoltages. The protection circuit comprises: protection devices each having a heating resistor and a fuse element provided on a circuit board; and sensing means for detecting an overvoltage across any of the batteries in the battery pack and switching a current flowing into the heating resistor. The plurality of protection devices are connected in parallel. In an overcurrent condition, the fuse element is melted at each protection device. Additionally, in an overvoltage condition on any of the batteries, the sensing means switches on the current flowing into the heating resistor, thereby causing a voltage across a predetermined number of the batteries in the battery pack to be applied to the heating resistor of each protection device, the heating resistor to generate heat, and the fuse element to be melted.

The first and second aspects are each to provide a protection circuit which protects a battery pack having rechargeable batteries connected in series from overcurrents and overvoltages. The protection circuit includes a protection device having heating resistors and fuse elements provided on a circuit board, and overvoltage sensing means.

In the first one of these protection circuits, the sensing means senses an overvoltage to switch on a current flowing into the heating resistor of the protection device and apply a voltage to the heating resistor of the protection device. At this time, the sensed voltage is not the voltage of the total number of serially connected batteries in the battery pack but the voltage across any of the serially connected batteries. For this reason, the heating resistor can be shared between a protection device used in a protection circuit for a battery pack having a larger number of serially connected batteries and a protection device used in a protection circuit for a battery pack having a smaller number serially connected batteries. This makes it possible to avoid producing many different protection devices, thereby reducing the manufacturing costs of the protection circuit. Furthermore, according to an embodiment of the protection circuit, a voltage sensing IC having a low voltage rating can detect an overvoltage on a battery pack having a high voltage rating. Here, assuming that the sensed voltage is a voltage across an individual battery between any batteries, it is possible to observe a charged condition according to a variation in the characteristics of each individual battery in the battery pack. On the other hand, in this protection circuit, a plurality of sensing means can be provided to detect an overvoltage between different batteries in the battery pack. In this case, even when such a voltage sensing IC is not available which has a high voltage rating and detects an overvoltage on the whole battery pack due to its larger number of serially connected batteries, it is possible to form a protection circuit using an existing voltage sensing IC having a low voltage rating corresponding to a battery pack having a smaller number of serially connected batteries.

In the second one of these protection circuits, the protection devices are connected in parallel, and thus the fuse elements are also connected in parallel. For this reason, the fuse element of the protection device can be shared between a protection circuit allowing a larger current to flow through the battery pack and a protection circuit allowing a smaller current to flow through the battery pack, thereby reducing the manufacturing costs of the protection device. Accordingly, the protection circuit can be manufactured at reduced costs as a whole.

Additional features and advantages of the present invention are described in, and will be apparent from, the following Detailed Description and the figures.

DETAILED DESCRIPTION

Figure 1:
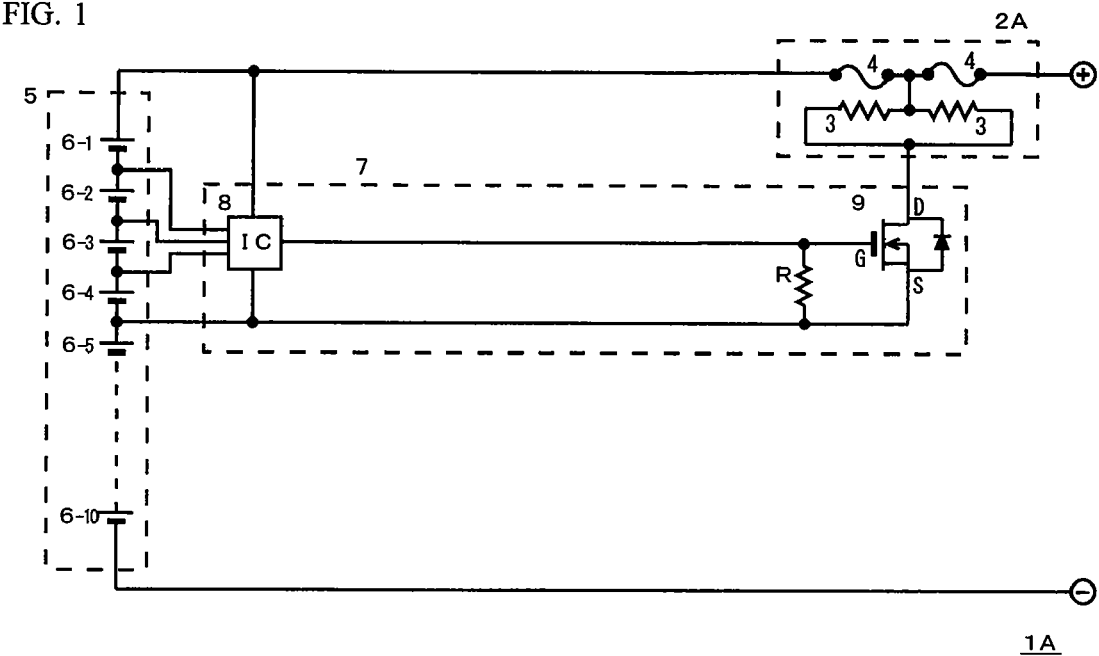
FIG. 1 shows a protection circuit according to an embodiment.

FIG. 1 shows a protection circuit 1A according to one embodiment of the first aspect. The protection circuit 1A protects a battery pack 5 having ten serially connected rechargeable batteries 6-1 to 6-10 from overcurrents and overvoltages, and includes a protection device 2A and sensing means 7.

As described in the publication of Japanese Patent No. 2790433 and Japanese Patent Laid-Open Publication No. 2000-285778, the protection device 2A is designed to have heating resistors 3 and fuse elements 4 provided on a circuit board, so that a current flows through the heating resistors 3 to generate heat thereby causing the fuse element 4 to be melted.

The sensing means 7 includes a voltage sensing IC 8 and an FET 9. The voltage sensing IC 8 is connected so as to sense a voltage between the first battery 6-1 and the fourth battery 6-4, and output the sensed signal to the gate of the FET 9. By connecting the voltage sensing IC 8 in this manner, the voltage sensing IC 8 suitable for sensing the serial voltage of four batteries can be used to detect an overvoltage on the battery pack 5 having ten serially connected batteries. In particular, in this protection circuit 1B, the voltage sensing IC 8 is connected so as to also detect a voltage on individual batteries between the first battery 6-1 and the fourth battery 6-4. Accordingly, it is possible to detect an overvoltage on each battery even in the presence of variations in characteristics of the individual batteries accommodated in the battery pack 5 and variations in voltage on the individual batteries during charging.

In the protection circuit 1A, an overcurrent flowing through the battery pack 5 would cause the fuse element 4 of the protection device 2A to be melted. Furthermore, an overvoltage on the battery pack 5 would cause the FET 9 to have a gate potential above a predetermined voltage and to be thereby switched on. This in turn causes a current to suddenly flow through the drain-source of the FET 9 and thus a current to suddenly flow through the heating resistor 3 of the protection device 1A, thereby causing the heating resistor 3 to generate heat and the fuse element 4 to be melted.

Here, since the source terminal of the FET 9 is connected between the battery 6-4 and the battery 6-5 in the battery pack 5, a voltage across the heating resistor 3 under the switched-on condition is not the voltage across the battery pack 5 but a serial voltage across four batteries that is defined by the position of this connection. Thus, according to this protection circuit, the heating resistor 3 suitable for a serial voltage across four batteries applied to the heating resistor 3 under the switched-on condition can also be used to cope with an overvoltage on the battery pack 5 having ten serially connected batteries, thereby providing the protection circuit at reduced costs.

In consideration of troubles caused by a short circuit between batteries, a voltage across as many serially connected batteries as possible is preferably applied to the heating resistor 3 under the switched-on condition. However, since there is an extremely low possibility of a short circuit between batteries, a voltage across two or more serially connected batteries may be applied to the heating resistor 3 in practice.

Furthermore, the protection circuit 1A of FIG. 1 is provided with a resistor R between the gate and the source of the FET 9. This is because the gate potential of the FET 9 needs to be made higher to a certain extent than the source potential in order to switch on the N-channel TFT when the voltage sensing IC 8 has detected an overvoltage.

Figure 2:
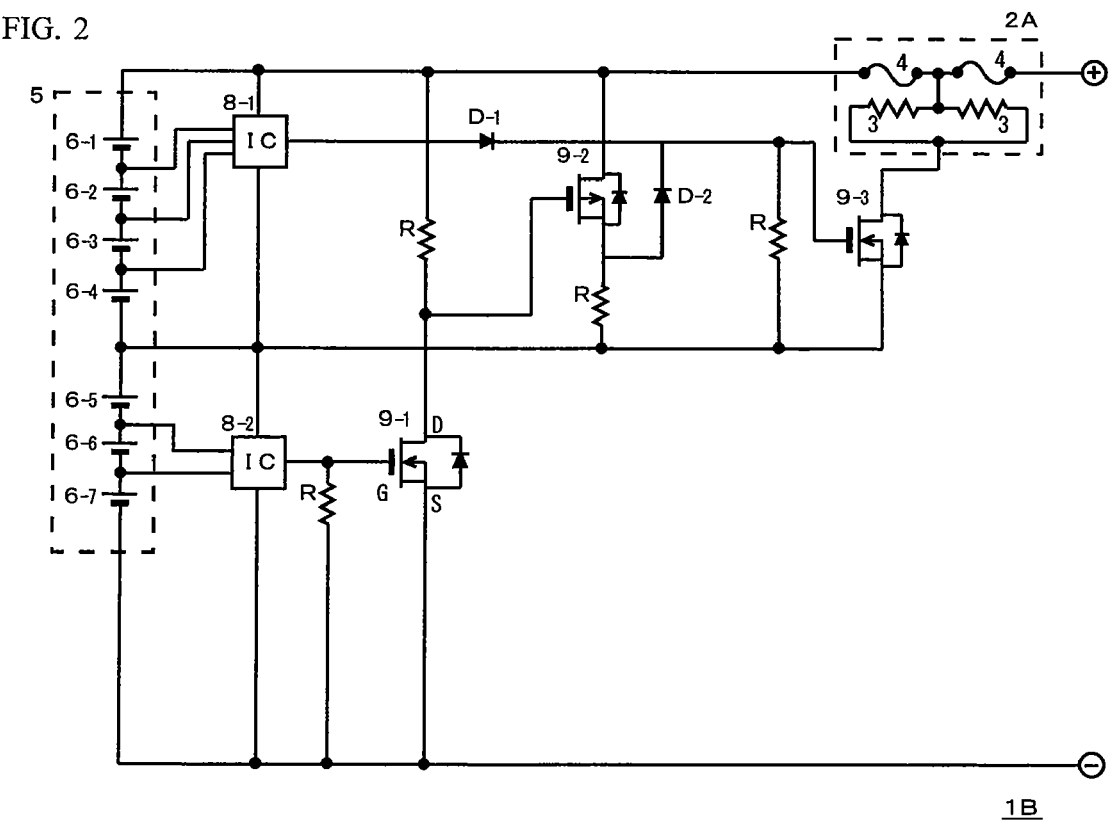
FIG. 2 shows a protection circuit according to an embodiment.

Like the protection circuit 1A of FIG. 1, a protection circuit 1B of FIG. 2 is designed such that a voltage sensing IC 8-1 is connected so as to sense a voltage between the first battery 6-1 and the fourth battery 6-4, and a voltage sensing IC 8-2 is also connected between the remaining battery 6-5 and the seventh battery 6-7, thus providing two voltage sensing ICs. When either the voltage sensing IC 8-1 or 8-2 has sensed an overvoltage, the fuse element 4 of the protection device 2A is melted to thereby protect the battery pack 5 from being overcharged.

That is, when an overvoltage occurs on any one battery between the first battery 6-1 and the fourth battery 6-4, the voltage sensing IC 8-1 raises the gate potential of an FET 9-3 causing the FET 9-3 to be switched on. This in turn causes a current to suddenly flow through the heating resistor 3 of the protection device, thereby allowing the heating resistor 3 to generate heat and the fuse element 4 to be melted.

On the other hand, when there occurs an overvoltage on any one battery between the fifth battery 6-5 and the seventh battery 6-7, the voltage sensing IC 8-2 raises first the gate potential of an FET 9-1 causing a current to suddenly flow through the drain-source of the FET 9-1 and thereby lowering the gate potential of a FET 9-2. Since this FET 9-2 is a P-channel FET, the FET 9-2 is switched on due to a drop in the gate potential, causing a current to suddenly flow through the drain-source. This raises the gate potential of the FET 9-3 causing the FET 9-3 to be switched on, thus allowing a current to suddenly flow through heating resistor 3 of the protection device. The heating resistor 3 thus generates heat to melt the fuse element 4. Here, diodes D-1 and D-2 are provided in order to prevent the raised gate potential of the FET 9-3 from being lowered via other parts of the circuit.

Thus, according to the protection circuit 1B, the voltage sensing ICs 8-1 and 8-2 corresponding to, for example, three or four serially connected batteries can be used to perfectly prevent an overvoltage occurring on the battery pack having ten serially connected batteries. In other words, even when such a voltage sensing IC is not available which has a high voltage rating and detects an overvoltage on the whole battery pack due to its larger number of serially connected batteries, it is possible to form a protection circuit using an existing voltage sensing IC having a low voltage rating corresponding to a battery pack having a smaller number of serially connected batteries.

Figure 3:
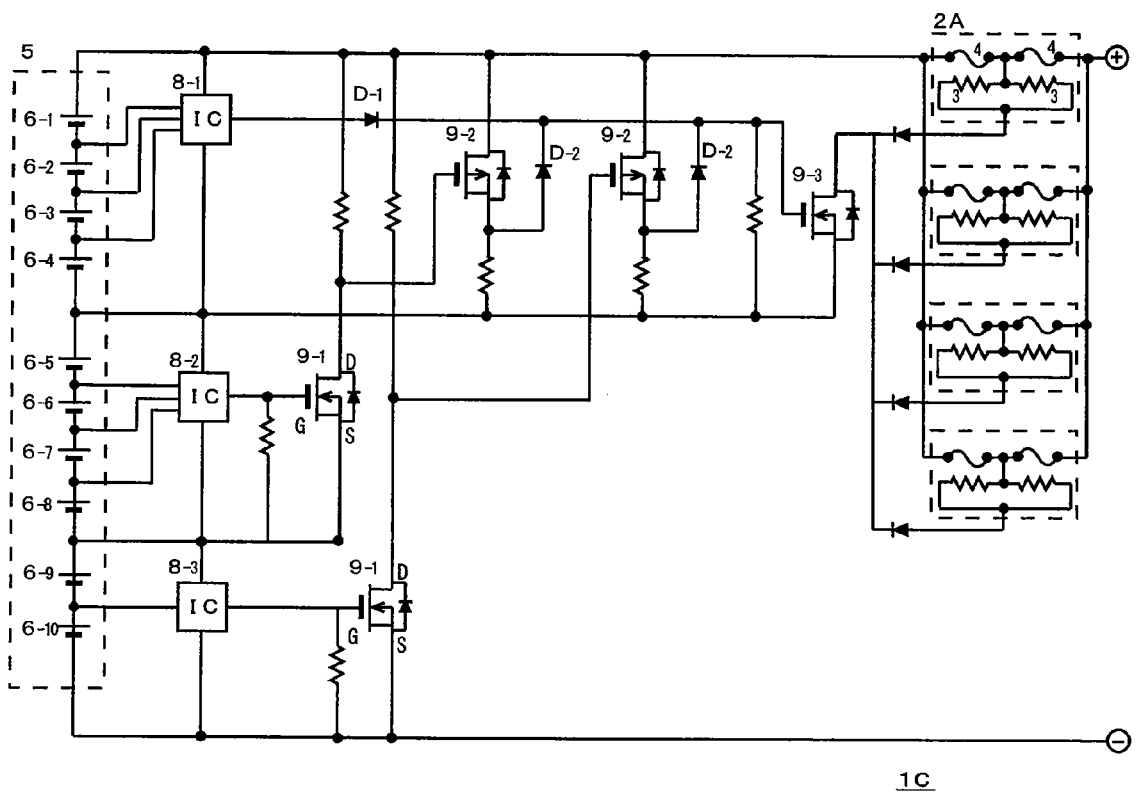
FIG. 3 shows a protection circuit according to an embodiment.

FIG. 3 is a protection circuit 1C according to one embodiment of the second aspect o directed to a large-current battery pack. The protection circuit 1C is provided with four protection devices 2A in parallel, which are the same as the one described above. Accordingly, even when a large current flows into the battery pack 5 in its normal conducting condition and the fuse element 4 would be melted in a case of the protection device 2A being singly provided, the protection circuit 1C allows the conduction path to be branched into four shunts in the protection device 2A, thus preventing the fuse element 4 from being melted.

On the other hand, in an overcurrent condition, the fuse element 4 of each protection device 2A is melted. Thus, according to the protection circuit 1C, the fuse element of the protection device can be shared between a protection circuit allowing a larger current to flow into the battery pack and a protection circuit allowing a smaller current to flow into the battery pack, thereby reducing the manufacturing costs of the protection device.

Figure 4:
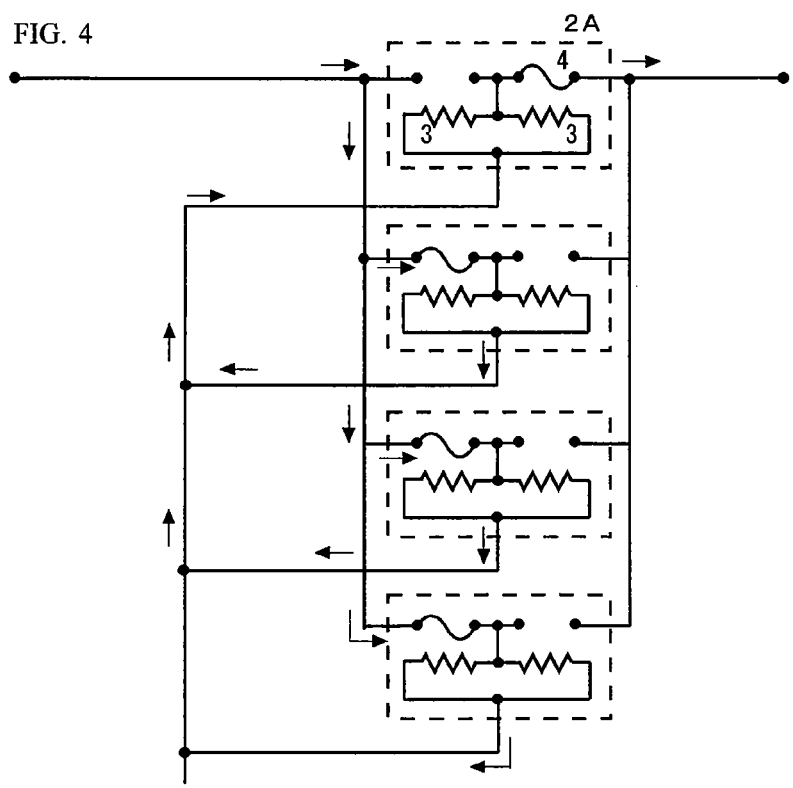
FIG. 4 is an explanatory view showing a conduction path where a fuse element is melted in a circuit having protection devices arranged in parallel.
Figure 5:
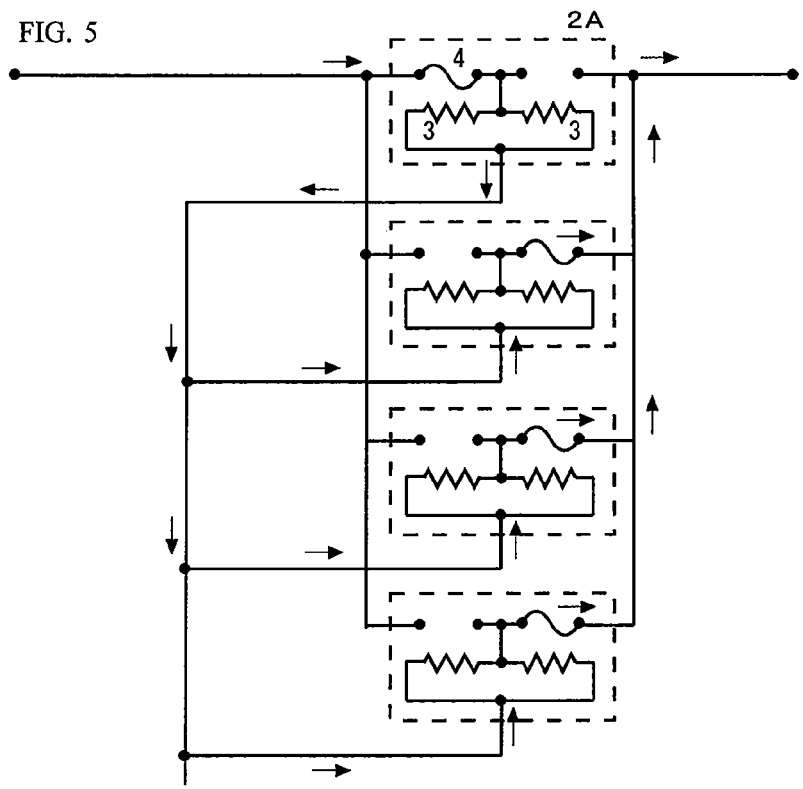
FIG. 5 is an explanatory view showing a conduction path where a fuse element is melted in a circuit having protection devices arranged in parallel.
Figure 6:
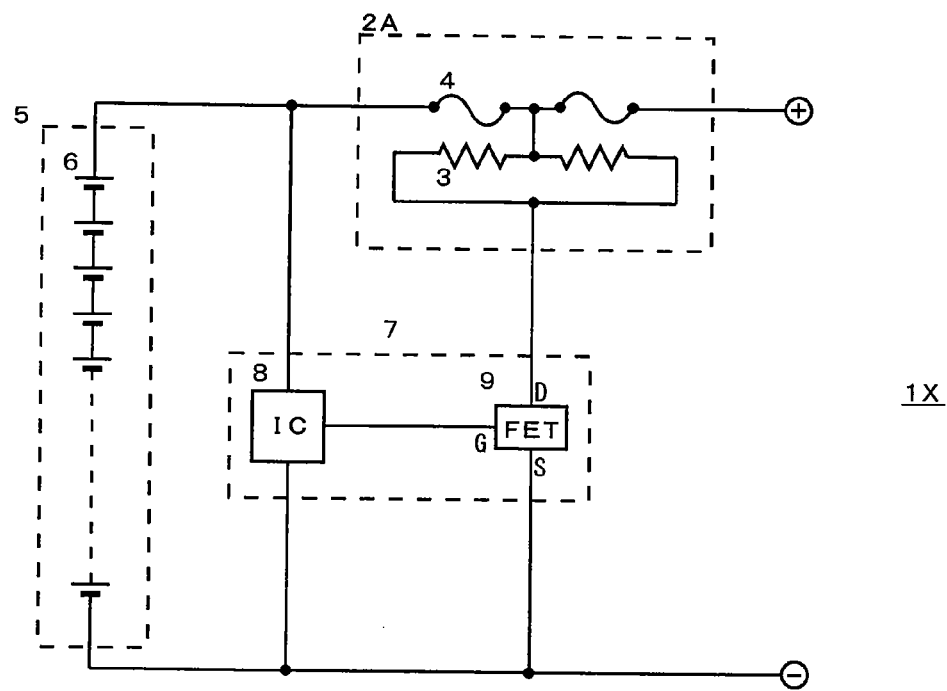
FIG. 6 is an explanatory view showing a problem with a conventional protection circuit.
Figure 7:
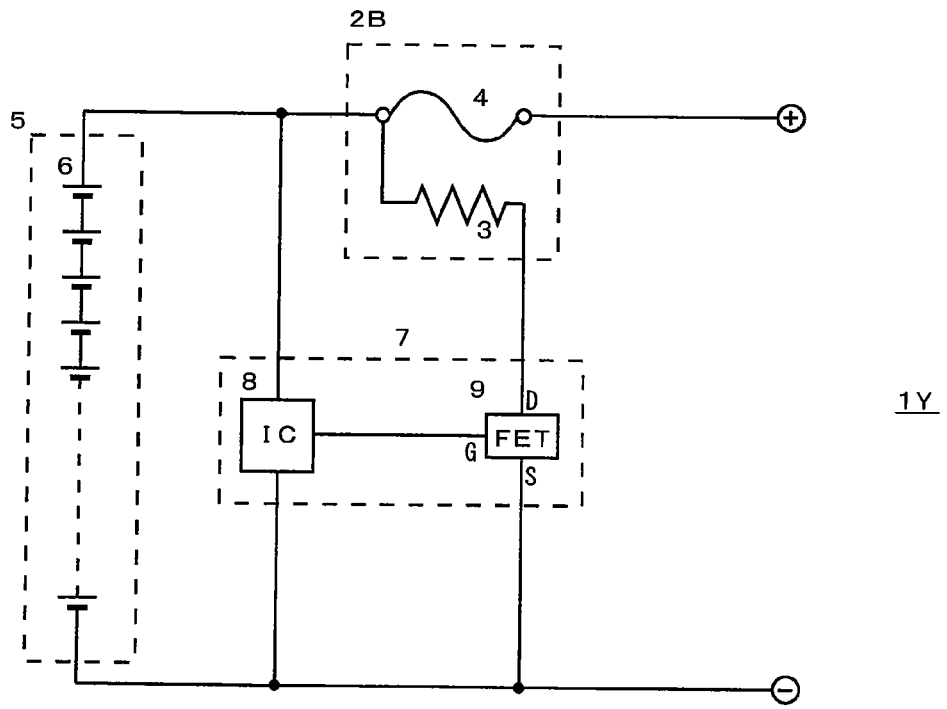
FIG. 7 is an explanatory view showing a problem with a conventional protection circuit.

Suppose that in a circuit having protection devices arranged in parallel, an overcurrent causes the fuse element 4 to be melted, for example, in a way as shown in FIG. 4 or FIG. 5. In this case, there will remain conduction paths in the circuit as shown by the arrows even after the fuse element 4 has been melted. In order to prevent such a conduction path from remaining after the fuse element 4 has been melted, a rectifier element is preferably connected to the heating resistor, and thus in the protection circuit 1C shown in FIG. 3, a diode is connected to the protection device 2A. Alternatively, an FET may also be connected as the rectifier element to the protection device 2A.

Furthermore, pursuant to the two voltage sensing IC stages provided in the protection circuit 1B of FIG. 2, the protection circuit 1C is provided with three voltage sensing IC stages, and each of voltage sensing ICs 8-1, 8-2, and 8-3 employed is suitable for sensing the voltage of two to four serially connected batteries. Each of the voltage sensing ICs 8-1, 8-2, and 8-3 senses not only the voltage across a row of batteries respectively but also the voltage on individual batteries. Thus, according to the protection circuit 1C, even when any one of the ten batteries 6-1 to 6-10 is overcharged, any one of the three voltage sensing ICs 8-1, 8-2, and 8-3 senses it, causing the FET 9-3 to be switched on. This in turn allows a serial voltage of the four batteries 6-1 to 6-4 to be applied to each heating resistor 3 of the protection device 2A, thereby causing the heating resistor 3 to generate heat and the fuse element 4 to be melted. As described above, according to the protection circuit 1C, it is possible to form a protection circuit suitable for a battery pack having ten serially connected batteries, by using the voltage sensing IC and the protection device which are suitable for sensing the voltage across two to four serially connected batteries.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A protection circuit for protecting a battery pack having rechargeable batteries connected in series from overcurrents and overvoltages, the protection circuit comprising:
    a protection device having a heating resistor and a fuse element provided on a circuit board; and
    sensing means for detecting an overvoltage across any of the batteries in the battery pack and switching a current flowing into the heating resistor,
    wherein the fuse element is melted in an overcurrent condition, and in an overvoltage condition on any of the batteries,
    wherein the sensing means switches on the current flowing into the heating resistor wherein a voltage across the heating resistor is less than a voltage across a total number of batteries in the battery back, thereby causing the heating resistor to generate heat and the fuse element to be melted, and
    wherein the sensing means includes a FET, wherein a source terminal of the FET is connected between two batteries in the battery pack.

2. The protection circuit according to claim 1, comprising a plurality of sensing means for sensing an overvoltage between different batteries, wherein in an overvoltage condition on any of the batteries, the sensing means switches on a current flowing into the heating resistor.

3. The protection circuit according to claims 1 or 2, wherein in the overvoltage condition on any of the batteries, a voltage across a predetermined number of the batteries in the battery pack is applied to the heating resistor, wherein the predetermined number of the batteries in the battery pack is less than the total number of batteries in the battery pack.

4. A protection circuit for protecting a battery pack having rechargeable batteries connected in series from overcurrents and overvoltages, the protection circuit comprising:
    protection devices each having a heating resistor and a fuse element provided on a circuit board; and
    sensing means for detecting an overvoltage across any of the batteries in the battery pack and switching a current flowing into the heating resistor,
    wherein the plurality of protection devices are connected in parallel,
    wherein in an overcurrent condition, the fuse element is melted at each protection device,
    and wherein in an overvoltage condition on any of the batteries, the sensing means switches on the current flowing into the heating resistor, thereby causing a voltage across a predetermined number of the batteries in the battery pack to be applied to the heating resistor of each protection device, causing the heating resistor to generate heat, and causing the fuse element to be melted, wherein the predetermined number of the batteries in the battery pack is less than a total number of batteries in the battery pack, wherein a voltage across the heating resistor is less than a voltage across a total number of batteries in the battery back, and wherein the sensing means includes a FET, wherein a source terminal of the FET is connected between two batteries in the battery pack.

5. The protection circuit according to claim 4, wherein the heating resistor is connected with a rectifier element to prevent conduction resistance from remaining via the heating resistor when an overcurrent has caused the fuse element to be melted incompletely.

6. The protection circuit according to claim 1, wherein the sensing means detects a voltage on individual batteries in the battery pack.

7. The protection circuit according to claim 4, wherein the sensing means detects a voltage on individual batteries in the battery pack.

* * * * *